United States Patent
Jang et al.

(10) Patent No.: US 8,151,438 B2
(45) Date of Patent: Apr. 10, 2012

(54) METHOD FOR WIRING MOTOR COIL TO PREVENT CORROSION OF WIRING PART OF LEAD WIRE

(75) Inventors: Jeong Cheol Jang, Gwangju (KR); Seong Jung Ju, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 0 days.

(21) Appl. No.: 12/911,791

(22) Filed: Oct. 26, 2010

(65) Prior Publication Data

US 2011/0035933 A1 Feb. 17, 2011

Related U.S. Application Data

(63) Continuation of application No. PCT/KR2009/000676, filed on Feb. 12, 2009.

(30) Foreign Application Priority Data

Jan. 19, 2009 (KR) .......................... 10-2009-0004062

(51) Int. Cl.
*H02K 15/00* (2006.01)

(52) U.S. Cl. ................................ 29/596; 29/825; 310/43

(58) Field of Classification Search ............ 29/596–598, 29/592.1, 605–606, 732–736; 310/42–45
See application file for complete search history.

(56) References Cited

U.S. PATENT DOCUMENTS

| 6,622,369 | B1 * | 9/2003 | Hwang et al. ................... 29/596 |
| 6,782,600 | B2 * | 8/2004 | Yamazaki et al. ............... 29/596 |
| 6,959,486 | B2 * | 11/2005 | Ponzio et al. ................... 29/735 |
| 2011/0035933 | A1 * | 2/2011 | Jang et al. ....................... 29/596 |

FOREIGN PATENT DOCUMENTS

| KR | 10-1998-0058206 | 9/1998 |
| KR | 20-0243445 | 10/2001 |
| KR | 10-2007-0010398 | 1/2007 |

* cited by examiner

*Primary Examiner* — Minh Trinh
(74) *Attorney, Agent, or Firm* — Sherr & Vaughn, PLLC

(57) ABSTRACT

The present invention provides a wiring method of a motor for connecting a coil wound around an armature of the motor and having a coating layer on a core made of aluminum material to a lead wire connected to power source, comprises the steps of: removing the coating layer on the end position of the coil; electrically connecting the end of the lead wire with the end of the coil in which the coating layer is removed; covering the connected part of the end of the lead wire and the end of the coil with a tube; and performing a varnishing process by impregnating the part covered with the tube with an insulation varnish solution.

4 Claims, 3 Drawing Sheets

[Fig. 1]
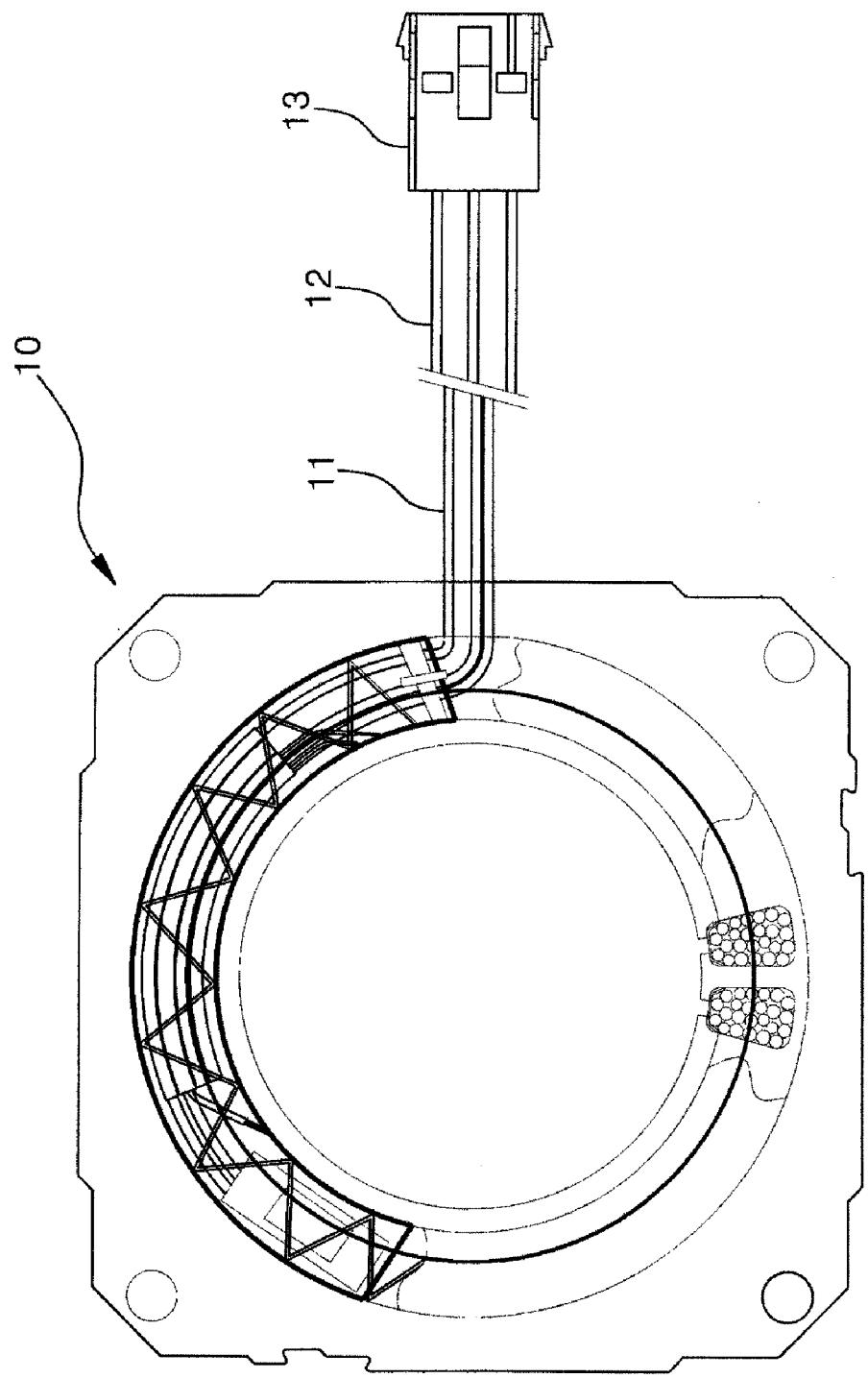

[Fig. 2]
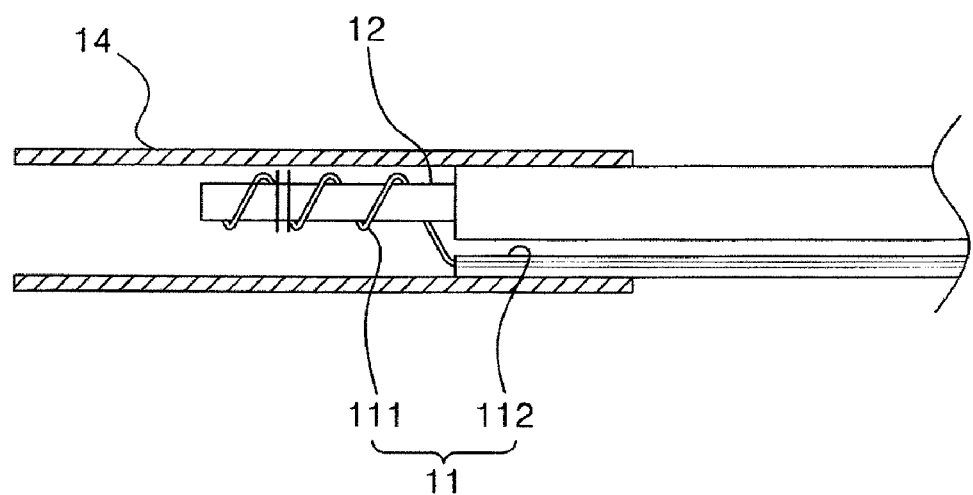
[Fig. 3]
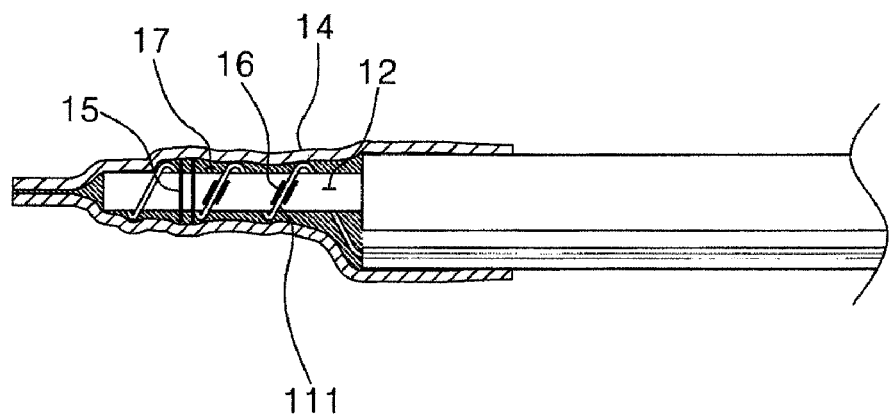

[Fig. 4]
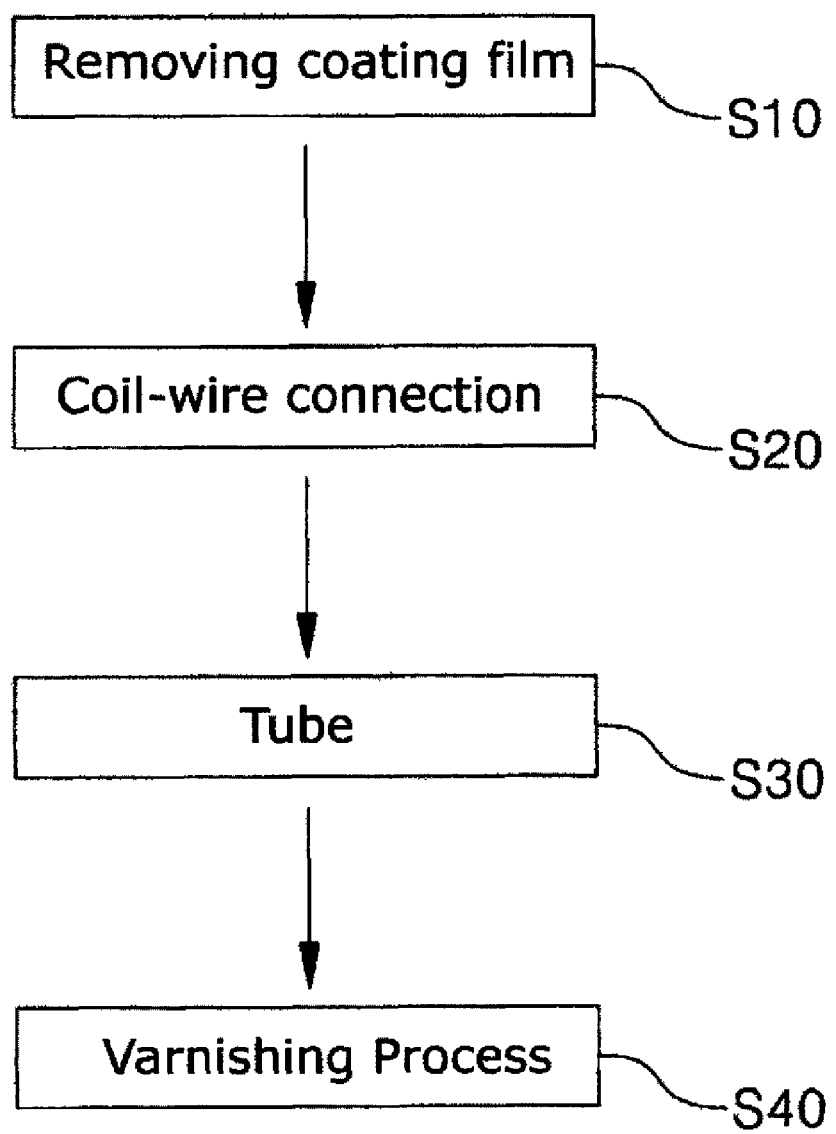

METHOD FOR WIRING MOTOR COIL TO PREVENT CORROSION OF WIRING PART OF LEAD WIRE

CROSS REFERENCE TO PRIOR APPLICATIONS

This application is Continuation of PCT International Application No. PCT/KR2009/000676 (filed on Feb. 12, 2009) designating the United States, which claims priority to Korean Patent Application No. 10-2009-0004062 (filed on Jan. 19, 2009), which are all hereby incorporated by reference in their entirety.

BACKGROUND

The present invention relates to a wiring method of a motor, which more specifically can prevent the corrosion of a wiring part of a lead wire electrically connected to a coil of the motor.

In general, a motor is a device that generates a rotation power by transforming electrical energy into mechanical energy, and the motor is classified as an AC motor and a DC motor according to the type of power applied and the AC motor is being used for the actuation of electric home appliances.

The motor comprises a stator and a rotor and rotates by a torque on the rotor generated from the rotating magnetic field generated during the flow of AC on armature windings.

The motor is configured such that a coil wound on an armature is connected to the power source, and for this connection, the coil is wired on a lead wire connected to the power source.

Copper is being used for the coil wound on the armature, but it costs a lot and increases the cost of manufacturing the motor. Thus, now, aluminum coil, instead of copper coil, is being used to decrease the manufacturing cost of the motor and provide raw material in a stable manner.

However, aluminum has a poor ductility relative to copper. Therefore, aluminum can be easily broken by an outer impact during the winding. Also, since aluminum is weak against water, in particular salt water, it can be easily corroded and broken down in case that it is in contact with salt water.

SUMMARY OF THE INVENTION

The present invention is devised under the recognition of the above problems and the purpose of the invention is to provide a wiring structure of a motor and a method thereof to cover a wiring part of a lead wire electrically connected to a motor coil with a heat-shrinkage tube, thereby sealing the wiring part firmly to prevent the corrosion.

To achieve the purpose, the motor according to the invention provides a wiring method of a motor for connecting a coil wound around an armature of the motor and having a coating layer on a core made of aluminum material to a lead wire connected to power source, comprises the following steps: removing the coating layer on the end position of the coil; electrically connecting the end of the lead wire with the end of the coil in which the coating layer is removed; covering the connected part of the end of the lead wire and the end of the coil with a tube; and performing a varnishing process by impregnating the part covered with the tube with an insulation varnish solution.

Also, the wiring method according to present invention is characterized in that at the step of performing a varnishing process, the tube is a heat-shrinkage tube, and the part covered with the heat-shrinkage tube is impregnated with heated varnish solution.

Also, the wiring method according to the present invention is characterized in that at the step of performing a varnishing process, the whole coil is varnished while the coil is wound.

Further, the wiring method according to the present invention is characterized in that the end of the coil is connected to the end of the lead wire by soldering.

The wiring structure of the motor as described above has an advantage to cover a wiring part of a lead wire electrically connected to a motor coil with a heat-shrinkage tube and to varnishing the wiring part, thereby sealing the wiring part firmly to prevent the corrosion.

BRIEF DESCRIPTION OF THE DRAWINGS

FIG. 1 represents a schematic view of an armature of a motor according to one embodiment of the present invention.

FIGS. 2 and 3 are cross sectional views showing schematically a wiring structure of a motor according to an embodiment of the present invention.

FIG. 4 is a flow chart of a wiring method of a motor according to an embodiment of the present invention.

DETAILED DESCRIPTION OF THE INVENTION

Wiring structure of a motor and wiring method thereof will be described in more detail in accordance with accompanying drawings hereinafter.

FIG. 1 represents a schematic view of an armature of a motor according to one embodiment of the present invention, FIGS. 2 and 3 are cross sectional views showing schematically a wiring structure of a motor according to an embodiment of the present invention, and FIG. 4 is a flow chart of a wiring method of a motor according to an embodiment of the present invention.

A motor by a method according to one embodiment of the present invention comprises a stator, and a rotor which rotates relative to the stator. In the drawings, one example of an armature in which coil is wound around a stator is shown, and it will be described mainly with, for brevity and clearness, a stator of an armature shown in the drawings.

The wiring method of a motor according to one embodiment of the present invention is to connect a coil 11 wound around an armature 10 of the motor and having a coating layer 112 on a core 111 made of aluminum to a lead wire 12 connected to power source.

Referring to the drawings, a wiring method of a motor according to one embodiment of the present invention comprises the following steps: removing the coating layer 112 on the end position of the coil 11 (S10); electrically connecting the end of the lead wire 12 with the end of the coil 11 in which the coating layer 112 is removed (S20); covering the connected part of the end of the lead wire 12 and the end of the coil 11 with a tube 14 (S30); and performing a varnishing process by impregnating the part covered with the tube 14 with an insulation varnish solution 17 (S40).

The step (S10) for removing the coating layer 112 on the end position of the coil 11 is a process of exposing an aluminum core 111 by removing the coating layer 112 to electrically connect the end of the coil 11 to the end of the lead wire 12.

The step (S20) for electrically connecting the end of the lead wire 12 with the end of the coil 11 in which the coating layer 112 is removed is a process of the electrical connection by twisting the end of the coil 11 against the end of the lead wire 12. Preferably, the connected part where the end of the coil 11 and the end of the lead wire 12 are twisted together is tied by a lacing 15 such that the connected part is not separated during the operation or the actuation of the motor. In particular, it is preferable to connect the end of the coil 11 with the end of the lead wire 12 with soldering 16. Soldering 16 makes the electric connection safely and firmly and prevents the disconnection. A connector 13 is connected to the other end of the lead wire 12.

The step (S30) for covering the connected part of the end of the lead wire 12 and the end of the coil 11 with a tube 14 is a process for covering the tube 14 made of insulating material to prevent the exposure of the connected part. The covering is made by the insertion of the connected part of the end of the coil 11 and the end of the lead wire 12 into the tube 14. FIG. 2 shows that the connected part of the coil 11 and the lead wire 12 is inserted into the tube 14. It is preferable that the width of the tube 14 is properly dimensioned such that the connected part is inserted easily and is not removed from the insertion easily. If the width of the tube 14 is undersized, it is hard to insert the connected part into the tube 14, and on the other hand, if the width is oversized, the connected part is released from the insertion very easily. Preferably, the tube 14 is a heat-shrinkage tube. The connected part is inserted into the heat-shrinkage tube 14 before the tube is shrunk, and then the tube 14 is closely attached to the connected part due to the shrinkage by the application of the heat on the tube 14, thereby the connected part being not disengaged from the tube 14.

The step (S40) for performing a varnishing process by impregnating the part covered with the tube 14 with an insulation varnish solution 17 is a process for sealing the connected part of the end of the coil 11 and the end of the lead wire 12 by the permeation of varnish solution 17 into the gap between the tube 14 and the connected part of the end of the coil 11 and the end of the lead wire 12 and then by hardening of varnish solution. In case that a heat-shrinkage tube is used for the tube 14, while varnish solution 17 is heated and melted, the part covered with the tube 14 is impregnated with varnish solution, and thus the heat-shrinkage of the tube 14 and the permeation of the varnish solution 17 into the inner gap of the tube 14 can be occurred together, thereby enhancing the efficiency of the process. FIG. 3 shows that the tube 14 is shrunk and the varnish solution 17 is filled in the inner gap and then hardened.

Meanwhile, wound coil 11 is varnished to fix the winding and in the present invention, the part covered with the tube 14 is varnished during the varnishing process of the coil. During the varnishing process, the whole coil together with the part covered with the tube 14 is varnished with the coil 11 being wound, thereby the process can be performed efficiently.

The wiring method for motor as described above and shown in the drawings is merely one example to carry out the present invention, but cannot be construed as limiting the technical spirit of the invention. The scope of protection of the invention is determined only by the accompanying claims and various modifications and alterations of the embodiments not departing from the features of the invention are within the scope of the present invention insofar as they are obvious from those skilled in the art.

The present invention designed as described above provides a wiring structure of a motor and a wiring method thereof which can prevent the corrosion of a wiring part of a lead wire electrically connected to a coil of the motor.

The invention claimed is:

1. A wiring method of a motor for connecting a coil wound around an armature of the motor and having a coating layer on a core made of aluminum material to a lead wire connected to power source, comprises the following steps:

removing the coating layer on the end position of the coil;

electrically connecting the end of the lead wire with the end of the coil in which the coating layer is removed;

covering the connected part of the end of the lead wire and the end of the coil with a tube; and performing a varnishing process by impregnating the part covered with the tube with an insulation varnish solution.

2. The wiring method as defined in claim 1, wherein at the step of performing a varnishing process, the tube is a heat-shrinkage tube, and the part covered with the heat-shrinkage tube is impregnated with heated varnish solution.

3. The wiring method as defined in claim 1, wherein at the step of performing a varnishing process, the whole coil is varnished while the coil is wound.

4. The wiring method as defined in claim 1, wherein the end of the coil is connected to the end of the lead wire by soldering.

* * * * *